United States Patent [19]

Pulaski

[11] 3,993,016

[45] Nov. 23, 1976

[54] PROTECTIVE ENCLOSURE AND POSITION WARNING DEVICE FOR OUTDRIVE ENGINES

[76] Inventor: Eugene A. Pulaski, P.O. Box 42229, Houston, Tex. 77042

[22] Filed: Aug. 4, 1975

[21] Appl. No.: 603,022

[52] U.S. Cl. .................................. 116/2; 114/209; 116/28 R

[51] Int. Cl.² .......................................... B60Q 1/30

[58] Field of Search ................. 150/52 R; 116/2, 30, 116/114 AJ, 26; 114/209; 115/.5 R, .5 A; 206/319, 318

[56] References Cited

UNITED STATES PATENTS

| | | | |
|---|---|---|---|
| 1,218,244 | 3/1917 | Donavan | 150/52 R |
| 1,261,846 | 4/1918 | Osgood | 150/52 R |
| 2,166,520 | 7/1939 | Challoner | 116/28 R |
| 2,434,784 | 1/1948 | Bardin | 150/52 R |
| 2,475,135 | 7/1949 | Haven | 150/52 R |
| 2,498,113 | 2/1950 | Milner | 150/52 R |
| 3,276,416 | 10/1966 | Dirks | 116/28 R |
| 3,587,508 | 6/1971 | Pearce | 150/52 R |

FOREIGN PATENTS OR APPLICATIONS

| | | | |
|---|---|---|---|
| 1,180 | 1/1890 | United Kingdom | 114/209 |

*Primary Examiner*—S. Clement Swisher
*Assistant Examiner*—Denis E. Corr
*Attorney, Agent, or Firm*—Bard, Springs & Jackson

[57] ABSTRACT

A protective enclosure and position warning device for the lower drive gear unit of outboard motors carried by boats and for the outdrive portion of inboard/-outdrive type boat engines comprises an enclosure formed of water impervious material which is adapted to be fitted about the drive unit of a marine engine for protection of the drive unit from deterioration by water, dirt, dust, etc. The enclosure is provided with closure means that secures the enclosure in assembly with the drive unit and is also provided with a reinforced drain opening that will allow any water that might enter the enclosure to exit by way of the drain. The material from which the enclosure is composed is of a color that is highly visible during the light of day and the material is also light reflective, enabling the protective enclosure to be readily seen when lighted by the light of automotive head lamps at night. The shape of the enclosure including the opening through which the drive unit of the marine engine is received is of such configuration and cooperates with the closure structure of the enclosure to serve as a sea anchor and as a distress signal device when not being utilized as a protective enclosure for marine engines.

14 Claims, 4 Drawing Figures

FIG. 1
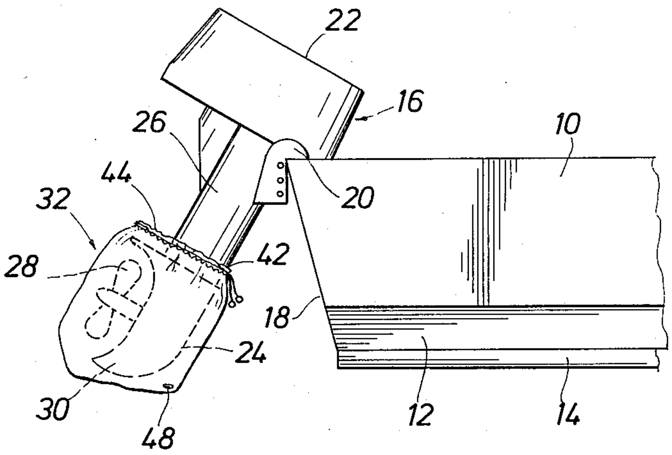
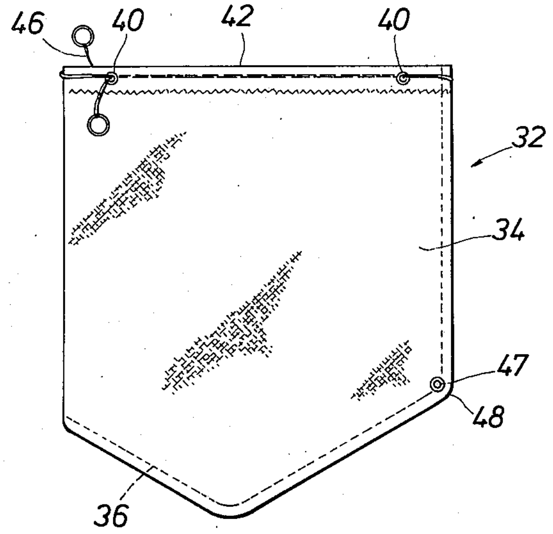
FIG. 2
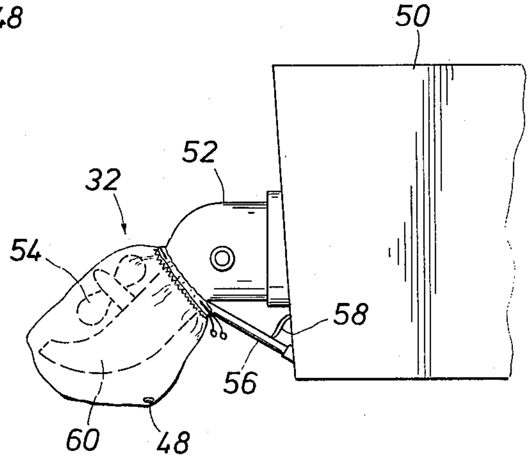
FIG. 3
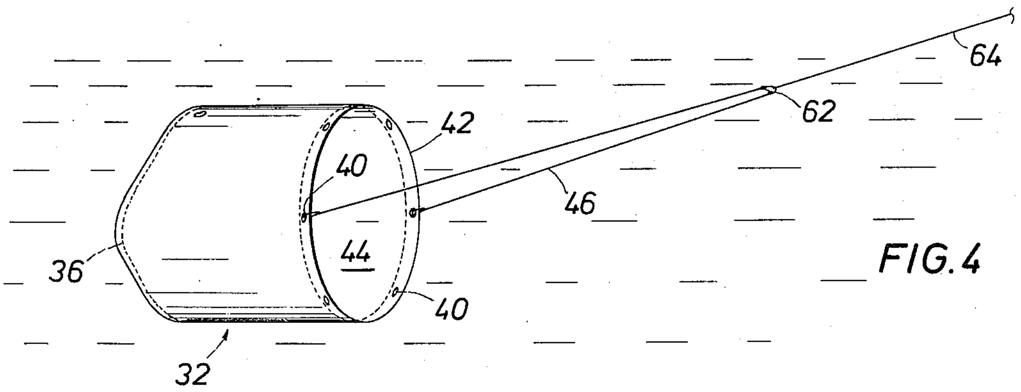
FIG. 4

PROTECTIVE ENCLOSURE AND POSITION WARNING DEVICE FOR OUTDRIVE ENGINES

FIELD OF THE INVENTION

This invention relates generally to protective devices that might be utilized for protection of the outdrive unit or lower drive unit of various types of marine engines and more particularly the invention is directed to a protective enclosure structure that may be secured about the drive unit of marine engines to protect the same against contamination by dust, water, dirt, etc., and additionally to provide a highly visible means for effectively warning other motorists of the position of the drive unit as a boat having an outboard or inboard/-outdrive marine engine being trailered. Even more specifically, the invention is directed to a protective enclosure structure for marine engines, which protective enclosure, when not being utilized in the capacity of an enclosure, is designed to have other functions to enhance marine safety.

BACKGROUND OF THE INVENTION

Because of present interest in water sport recreation such as fishing, water skiing, pleasure boating, etc., many many thousands of boats are transported to and from water recreational areas on boat trailers. Whether the boat is of the outboard type or of the inboard/outdrive type, the drive gear mechanism including the propeller and skeg of the outdrive mechanism will typically be subjected to deterioration by the hazardous environment that is created during trailering. The drive unit, regardless of the particular type of boat and motor combination, will typically be trailed in close proximity to the roadway in a fairly exposed position where dust, dirt, water, mud, rocks, and other contaminants can subject the drive units to damage. It is desirable, of course, to provide some sort of protective cover to protect the drive unit as much as possible from deterioration by the hazards often encountered during trailering.

Another serious aspect of boat trailering is the susceptibility of the outboard propeller drive structure to damage by automotive vehicles operating behind the boat and trailer being towed. A major cause of such damage is the fact that the drive unit of either an outboard motor in the trailering position or the outdrive unit of an inboard/outdrive engine mechanism also in the trailering position thereof extend a considerable distance behind the transom of the boat. The operator of a following automotive vehicle tends to concentrate mainly on the transom of the boat being towed ahead and is inclined not to pay particular attention to the distance that the drive unit extends out beyond the transom of the boat. His judgment of the distance between his vehicle and the trailing extremity of the boat structure ahead is often impaired by his inability to visualize the position of the drive unit of the boat engine and his concentration mainly on the transom of the boat. Moreover, in night trailering of boats, the lights of the vehicle mainly light the transom of the boat, especially if it is of light color thereby leaving the drive unit of the marine engine largely imperceptible. It is therefore desirable to provide some suitable means for causing drivers of following automotive vehicles to readily visualize the marine drive unit in order that his judgment of the distance between his vehicle and the drive unit can be clearly established.

Where the drive units of boat engines are provided with protective enclosures contamination by water, dust, etc., water often collects within the enclosures by running down the drive unit during a rain, for example, or by water simply draining out of the drive unit structure itself. It is also disirable to provide means for insuring that water does not collect within the protective enclosure either in trailering or during storage of the boat and trailer.

It is also desirable in the operation of boats to provide means for distress signaling and to protect the boat against swamping under conditions where the engine might not be functioning properly. Because the space in boats is typically limited, protective devices such as signal flags and sea anchors are often excluded even though they are quite valuable. It is desirable, therefore, to provide safety devices that have more than one desirable function in order to promote better boating safety.

Accordingly, the present invention has as its primary feature, the provision of a novel protective enclosure for the drive unit of marine engines that provides effective protection of the drive unit from contamination by road hazards, including dirt, dust, rocks, water, etc., during trailering to and from water recreational sites.

It is also a feature of the present invention to provide a novel protective enclosure structure for the drive units of marine engines that is highly visible both during the light of day and when lighted by automotive lamps at night.

It is a feature of the present invention to provide a novel protective enclosure for the drive units of marine engines that enables a following motorist to clearly visualize and concentrate on the position of the drive unit of a boat and engine assembly in order that his perception of the distance between his vehicle and the trailing extremity of the boat and engine assembly being trailered is clearly evident.

Among the several objects of the present invention is noted the contemplation of a novel protective enclosure structure for the drive units of marine engines having a drain structure that is located in the lowermost portion thereof that allows exit of any water or other liquid contaminants that might enter the enclosure in any manner whatever.

It is also a feature of the present invention to provide a novel protective enclosure for the drive units of marine engines that, in addition to its use as a protective device, also functions as a safety device in the form of a distress signaling device or a sea anchor when such use is desired.

Other and further objects, advantages and features of the present invention will become apparent to one skilled in the art upon consideration of this entire disclosure. The form of the invention, which will now be described in detail, illustrates the general principles of the invention but it is to be understood that this detailed description is not to be taken as limiting the scope of the present invention.

SUMMARY OF THE INVENTION

In accordance with the present invention, the drive unit of either an outboard or an inboard/outdrive engine for boats may be provided with a protective enclosure. The protective enclosure may conveniently take the form of a flexible enclosure that serves not only as a protective device to prevent contamination of the drive unit by water, dust, sand, rocks and other road hazards during trailering of the boat and motor assembly, but also provides as a position warning device that causes a following motorist's attention to be focused on the drive unit portion of the boat and motor assembly that typically extends several feet beyond the trailing extremity of the boat. The enclosure may be composed of a soft water impervious material such as plastic that for purposes of durability may be reinforced with a loosely woven fabric material and will be of a color that is highly visible during the light of day and will also have characteristics that make it highly reflective when exposed to the artificial light of a following automotive vehicle. The protective enclosure will also be formed to define a fairly large opening at the upper portion thereof which opening is adapted to receive the drive unit of the marine engine. The opening will be provided with a closure device such as a draw string received through a plurality of grommets that are provided about the opening. A drain opening may also be provided in the lower portion of the protective enclosure allowing water that might collect within the enclosure to exit by way of the drain. A grommet or other reinforcing structure may be provided about the drain opening to prevent the protective material from failing in the area of the drain opening.

For the purposes of safety, the color of the plastic material may be International Orange and it may additionally be iridescent to the point that it is highly visible during most lighting conditions. It may be employed to cause a trailing motorist's attention to be drawn to the position of the drive unit of the outboard motor rather than allowing his concentration to be directed to the position of the transom of the boat because of the highly visible nature thereof. When not being utilized as a protective enclosure for the drive unit, the enclosure may be kept in the boat as a combination safety device that may be waved to give a distress signal as needed, or that may be utilized as a sea anchor to provide appropriate control for the boat in the event the outboard engine should for some reason become inoperative. The opening through which the drive unit is inserted as the enclosure is assembled to the drive unit may be of a specific configuration that also facilitates the use of the enclosure structure as a sea anchor. Moreover, the closure elements, which may conveniently take the form of draw cords, may be utilized as connector devices to connect the sea anchor structure to the front or rear portion of the boat as desired.

BRIEF DESCRIPTION OF THE DRAWINGS

In order that the manner in which the above recited advantages and features of the invention are attained and can be understood in detail, a more particular description of the invention may be had by reference to a specific embodiment thereof which is illustrated in the appended drawings, which drawings form a part of this specification. It is to be noted, however, that the appended drawings illustrate only a typical embodiment of the invention and, therefore, are not to be considered limiting of its scope for the invention may admit to other equally effective embodiments.

In The Drawing:

FIG. 1 is a partial elevational view illustrating the rear portion of a boat and trailer assembly and illustrating an outboard motor supported by the transom of the boat with a protective enclosure constructed in accordance with the present invention being disposed in assembled relationship with the lower drive unit of the outboard engine.

FIG. 2 is an elevational view illustrating the configuration of the protective enclosure structure prior to assembly thereof to the drive unit of a marine engine.

FIG. 3 is a partial elevational view of a boat having an inboard marine engine with an outdrive power unit and with a protective enclosure constructed in accordance with the present invention being positioned in assembled relation to the propeller drive unit of the outdrive mechanism.

FIG. 4 is an elevational view illustrating the protective enclosure structure being employed as a sea anchor and showing the general configuration that the opening of the enclosure will assume as force is applied to it during use as a sea anchor.

DETAILED DESCRIPTION OF PREFERRED EMBODIMENT

Referring now to the drawings and first to FIG. 1, there is shown at 10, the rear extremity of a boat that is resting upon a boat support cushion 12 of a trailer assembly 14. An outboard marine engine illustrated generally at 16 may be secured to the transom 18 of the boat by means of suitable connection structure 20 that allows the engine to be tilted relative to the transom of the boat. Outboard engines of this type typically employ an engine head structure 22, typically referred to as the power unit that serves to provide a driving function for a gear drive unit 24 through an elongated shaft 26. The drive unit 24, which is also referred to in the industry as a "lower unit" or a lower drive unit, incorporates a gearing mechanism that translates rotation of a rotary drive shaft into a right angle drive for inducing rotation to a propellor 28. A skeg 30 forms part of the lower drive unit and curves rearwardly in such a manner as to protect the propeller 28 from damage in the event the lower unit should run aground during operation.

Outboard motors typically are positionable at three basic positions. The first of these positions is the drive position where the outboard engine is positioned with its drive shaft at or fairly near the vertical with the lower drive unit extending downwardly below the level of the boat hull and positioning the propeller well into the water. The second position which is shown in FIG. 1 is typically referred to as the trailering position where the drive shaft of the engine is maintained at an angular relation with the vertical. Large outboard engines will typically be provided with locking devices which lock the engine structure in the trailering position. With the engine in the trailering position and with the boat in the water, the lower drive unit of the engine will generally be in contact with the water. The third general position of the engine structure will be established when the engine has been pivoted between 70° and 90° from the vertical and the shaft structure 26 will be almost horizontal. This position may be referred to as the temporary storage position and causes the lower drive unit of the engine mechanism to be positioned well out of the water when the boat is resting on the water. In this position, the power unit as well as the lower drive unit of the engine may be serviced while the boat is in the water.

With an outboard engine in the trailering position such as shown in FIG. 1, the lower power unit of the engine extends well out beyond the transom 18 of the boat. In fact, the lower drive unit may extend approximately three feet from the transom of the boat rendering it susceptible to damage by a vehicle that might be following the trailered boat. A driver of a following vehicle will typically concentrate his attention on the transom of the boat because of the physical size of its structure and will not necessarily be aware of the distance that the drive unit of the engine extends beyond the transom of the boat. Many outboard engines have been damaged because of the inability of the driver of the following vehicle to concentrate on that part of a boat and motor assembly that is closest to him. To provide means for directing the attention of the driver of a following vehicle to the drive unit of an outboard motor and also to provide the drive unit with protection against dirt, sand, dust, rocks, water, etc., that can damage the drive unit, a protective enclosure may be provided such as illustrated generally at 32.

The protective enclosure 32, which is shown in its undisturbed state in FIG. 2, may conveniently take the form of a rectangular structure having two side surfaces 34. The generally rectangular enclosure may be formed by folding a rectangular sheet of material in half and by sewing or heat sealing two of the abutting edges such as 36 and 38.

The material from which the enclosure 32 may be formed may be a plastic material such as polyethylene that may be reinforced by a loosely woven fabric. The reinforced plastic material may be of the International Orange safety color in order to render it highly visible by the light of day and additionally may include a highly reflective substance giving it a high degree of reflective capability to enable highly visible reflections to occur when the material is lit by the artificial light produced by the head lamps of a following automotive vehicle.

To facilitate installation of the protective enclosure structure in an assembled but easily removable relationship with the lower drive unit of the outboard engine, a plurality of grommets 40 may be secured to the fabric reinforced plastic material adjacent the edge of the material 42 that defines the opening 44 through which the lower unit passes as the enclosure is assembled to the lower unit structure. Draw cords 46 may be extended through the openings of the grommets 40 and may be utilized to pull the edges 42 of the enclosure closely about the drive unit. With the material forming the opening 44 drawn up tightly against the drive unit, the cords may be suitable tied to secure the enclosure in place. Removal of the enclosure from the drive unit can be accomplished simply by untying the cord 46 and by pulling on the material sufficiently to cause the opening 44 to assume its maximum open dimension.

With the protective enclosure positioned as shown in FIG. 1, it is possible that water may enter the small openings that are defined as the cord is drawn closely to the lower drive unit. To prevent any accumulation of water within the enclosure at one corner of the enclosure there may be provided a drain opening 47 through which accumulated water will drain from the enclosure. To prevent the material from which the enclosure is composed from tearing in the vicinity of the drain opening 47, a grommet 48 or other suitable reinforcing structure may be secured to the material from which the enclosure is composed. The drain opening and the grommet are positioned such that with the drive unit of the engine in its trailering position, the drain opening will be located at the lowermost portion of the protective enclosure.

Referring now to FIG. 3, there is shown a partial elevation of a boat structure 50 having an inboard engine with an outdrive mechanism 52 provided to convert power of the engine into rotation of the propeller 54 carried by the drive unit. Typically, a hydraulic power unit 56 is provided that is powered by a suitable hydraulic pump through hydraulic control lines 58 and which serves to achieve positioning of the lower drive unit 60 of the outdrive mechanism. The protective enclosure 32 may be secured to the lower unit of the outdrive mechanism in the same manner as discussed above in connection with FIG. 1.

Referring now to FIG. 4, there is provided a descriptive illustration of the manner by which the protective enclosure 32 may also function as a sea anchor to provide for control of a boat in the event the engine of the boat should become disabled or in the event the boat is being specifically controlled with a sea anchor structure. The same protective enclosure structure may be rearranged by connecting the draw cord structure 46 to a suitable connector such as shown at 62 that in turn may be connected to a line 64 that secures the sea anchor to any suitable portion of the boat. To specifically provide the protective enclosure structure with a sea anchor capability, the opening 44 of the enclosure may be of any suitable specific configuration that will allow the opening to take on a particular shape when forces are applied by towing the enclosure through the water as a sea anchor. Regardless of the particular shape or size of the opening, the draw cords will simply pull the edges of the opening closely about the drive portion of the marine engine. Moreover, the protective enclosure, although being shown as constructed of generally rectangular configuration, may conveniently take any other suitable form that more readily adapts it to fit a particular drive unit of a marine engine. The configuration illustrated in the drawings, therefore, is not to be in any way considered limiting of the spirit and scope of the present invention.

In view of the foregoing, it is clear that a novel protective enclosure structure has been provided for the drive gear unit of outboard and outdrive engine mechanisms for boats which, in addition to providing a protective feature to prevent contamination of the drive unit by dirt, dust, sand, water, rocks, etc., also serves as a position warning device for directing the attention of a driver of a following vehicle to the specific position of the drive unit of the marine engine. This feature prevents the driver of the vehicle from having impaired judgment as to the distance between his vehicle and the trailing part of the boat and motor assembly being trailered. The protective enclosure may also be used as a distress signal because of its high degree of visibility and it also may be effectively utilitzed as a sea anchor for effective control of a boat as desired. Moreover, the protective enclosure, without in any way interfering with its protective capability, may have a specifically designed opening that facilitates effective and efficient use of the structure as a sea anchor. It is therefore seen that this invention is one well adapted to attain all of the objects and advantages hereinabove set forth, together with other features and advantages which will become obvious and inherent from a description of the structure itself. It will be understood that certain combinations and subcombinations are of utility and may be employed without reference to other features and subcombinations. This is contemplated and is within the scope of the present invention.

What is claimed is:

1. A protective cover and position warning device for the drive unit of outboard and outdrive engine mechanisms for boats, said cover comprising:

an enclosure of a configuration to receive the drive unit of said outboard and outdrive engine mechanisms and being formed of a high visibility water resistant material, said enclosure being formed to define an opening at one extremity thereof to receive said drive gear unit;

closure means being attached to said enclosure adjacent said opening and being manipulatable to draw the material at said opening of said enclosure about said drive unit, said closure means retaining said enclosure in assembly with said drive unit; and drain means is formed in said material of said enclosure and, when in assembly with said drive unit, is positioned at the lower portion of said enclosure, water entering said enclosure through said opening of said enclosure and from said engine will exit said enclosure at said drain means.

2. A protective cover and position warning device as recited in claim 1, wherein:

said drain means is an opening being formed in said enclosure; and a grommet is affixed to said material of said enclosure and is located about said drain opening, said grommet strengthening said material about said drain opening.

3. A protective cover and position warning device as recited in claim 1, wherein:

said material from which said enclosure is composed is of a safety color that is highly visible during the light of day, and said material is also highly reflective of artificial light.

4. A protective cover and position warning device as recited in claim 1, wherein:

said opening of said enclosure is of a form, defining an entry opening for water when disassembled from said drive unit, enabling said enclosure to function as a sea anchor; and said closure means defining sea anchor connector means when said enclosure is functioning as a sea anchor.

5. A protective cover and position warning device as recited in claim 1, wherein:

said material from which said enclosure is formed is a plastic film, said plastic film being reinforced by a fabric material;

a drain opening is formed in said material and is locatable at the lower portion of said protective cover when said protective cover is assembled to said drive gear unit, water entering said opening of said protective cover and exiting from said drive unit being drained from said protective enclosure through said drain opening; and reinforcing means being secured to said material of said enclosure about said drain opening.

6. A protective cover and position warning device as recited in claim 5, wherein:

said material from which said enclosure is composed is of a safety color that is highly visible during the light of day and is also highly reflective of artificial light.

7. A protective cover and position warning device as recited in claim 5, wherein:

said opening of said enclosure is of a form defining an entry opening for water when disassembled from said drive unit, enabling said enclosure to function as a sea anchor; and said closure means defining sea anchor connector means when said enclosure is functioning as a sea anchor.

8. A protective cover and position warning device as recited in claim 5, wherein:

said enclosure is of generally rectangular configuration, one corner of said enclosure assuming a lowermost position upon assembly of said enclosure to said drive unit; and said drain opening being defined in the proximity of said one corner.

9. A protective cover and positioning warning device as recited in claim 1, wherein:

said high visibility water resistant material of said enclosure is a single, generally rectangular sheet of material, said sheet of material being folded back on itself and defining three abutting edge portions; and means securing said material together along two of said abutting edge portions thereof, said third abutting edge portion defining said opening of said enclosure.

10. A protective cover and position warning device as recited in claim 9, wherein:

said means securing said material together comprises stitching.

11. A protective cover and position warning device as recited in claim 9, wherein:

said means securing said material together comprises a heat seal.

12. A protective cover and position warning device for the drive unit of outboard and outdrive marine engines, said cover comprising:

an enclosure being formed of flexible, water impervious sheet material having an opening formed therein of a size and configuration to receive the drive unit of said marine engines, said sheet material being of a safety color to render the enclosure highly visible by the light of day and being highly light reflective so as to render said enclosure highly visible in the light of headlamps of automotive vehicles;

closure means being provided at said opening and, when said enclosure is assembled to said drive unit, drawing the material about said opening closely about said drive unit;

drain means being defined in said sheet material and being located at the lowermost portion of said enclosure when said enclosure is assembled to said drive unit, water entering said enclosure through said opening and from said engine will exit said enclosure at said drain means; and means reinforcing said sheet material about said drain means.

13. A protective cover and position warning device as recited in claim 12, wherein:

said enclosure is of generally rectangular configuration defining a plurality of corners, one of said corners defining said lowermost portion of said enclosure; and said drain means being located at said one corner.

14. A protective cover and position warning device as recited in claim 13, wherein:

said material from which said enclosure is formed is a tough and flexible film composed of plastic material; and said plastic material being reinforced with a fabric material.

* * * * *